US012088048B2

(12) United States Patent
Cording

(10) Patent No.: US 12,088,048 B2
(45) Date of Patent: Sep. 10, 2024

(54) HYBRID PLUG-IN CONNECTOR

(71) Applicant: HARTING ELECTRIC STIFTUNG & CO. KG, Espelkamp (DE)

(72) Inventor: Christian Cording, Espelkamp (DE)

(73) Assignee: HARTING ELECTRIC STIFTUNG & CO. KG (DE)

( * ) Notice: Subject to any disclaimer, the term of this patent is extended or adjusted under 35 U.S.C. 154(b) by 349 days.

(21) Appl. No.: 17/635,152

(22) PCT Filed: Jul. 27, 2020

(86) PCT No.: PCT/DE2020/100669
§ 371 (c)(1),
(2) Date: Feb. 14, 2022

(87) PCT Pub. No.: WO2021/027991
PCT Pub. Date: Feb. 18, 2021

(65) Prior Publication Data

US 2022/0278489 A1 Sep. 1, 2022

(30) Foreign Application Priority Data

Aug. 14, 2019 (DE) ..................... 10 2019 121 872.1

(51) Int. Cl.
*H01R 13/6581* (2011.01)
*H01R 13/6463* (2011.01)
*H01R 24/54* (2011.01)

(52) U.S. Cl.
CPC ..... *H01R 13/6581* (2013.01); *H01R 13/6463* (2013.01); *H01R 24/547* (2013.01)

(58) Field of Classification Search
CPC ............ H01R 13/6581; H01R 13/6463; H01R 13/6585; H01R 13/6277; H01R 13/6584; H01R 13/6599; H01R 24/547
(Continued)

(56) References Cited

U.S. PATENT DOCUMENTS 4,483,575 A 11/1984 Krueger et al. ............ 399/14 P
6,500,030 B2 * 12/2002 Fischer ................ H01R 13/514 439/701
7,335,047 B2 * 2/2008 Bernat ............... H01R 13/6275 439/607.41
(Continued)

FOREIGN PATENT DOCUMENTS

DE 30 32 414 3/1982 ........... H01R 13/639
DE 298 04 728 8/1999 ........... H01R 13/502
(Continued)

OTHER PUBLICATIONS

International Preliminary Report in Patentability issued in PCT/DE2020/100669, dated Feb. 8, 2022, 7 pages.
(Continued)

*Primary Examiner* — Peter G Leigh
(74) *Attorney, Agent, or Firm* — HAYES SOLOWAY P.C.

(57) ABSTRACT

A hybrid plug-in connector for connecting electrically conductive contacts to a mating plug-in connector has at least two energy contacts for transferring electrical energy and four data contact pairs for transferring electrical signals and/or electronic data, includes a shielding element is formed such that the shielding of a data cable, first of all in the hybrid plug-in connector, and in the connected state of the hybrid plug-in connector to the mating plug-in connector is at least extensively maintained, wherein four data contact pairs are arranged in a principally rectangular insulating body, spatially separated from the energy contacts, the insulating body having an offset in the axial direction relative to the longitudinal axis of the hybrid plug-in connector between the data contact pairs and the energy contacts, such that the hybrid plug-in connector is uniquely positioned on the mating plug-in connector thereof during a plug-in process.

19 Claims, 5 Drawing Sheets

(58) Field of Classification Search
USPC .................................................... 439/607.01
See application file for complete search history.

(56) References Cited

U.S. PATENT DOCUMENTS

| | | | | |
|---|---|---|---|---|
| 7,402,078 | B2 * | 7/2008 | Wan | H01R 13/6594 439/607.17 |
| 7,740,501 | B2 * | 6/2010 | Ballard | H01B 9/003 174/105 R |
| 7,824,207 | B2 | 11/2010 | Bergner et al. | 439/352 |
| 8,226,431 | B2 | 7/2012 | Reimchen | 439/459 |
| 8,303,337 | B2 * | 11/2012 | Ballard | H01B 9/003 439/578 |
| 8,715,016 | B2 * | 5/2014 | DeBock | H01R 13/514 439/701 |
| 8,894,448 | B2 | 11/2014 | Affeltranger | 439/701 |
| 9,106,025 | B2 | 8/2015 | Brode et al. | H01R 13/6582 |
| 9,705,248 | B1 | 7/2017 | Ko | H10R 13/639 |
| 9,728,902 | B2 * | 8/2017 | Höher | H01R 13/6592 |
| 2011/0294342 | A1 | 12/2011 | DeBock et al. | 439/527 |
| 2012/0034809 | A1 * | 2/2012 | Reimchen | H01R 13/622 29/857 |
| 2014/0162488 | A1 | 6/2014 | Staudigel et al. | 439/372 |
| 2018/0261960 | A1 * | 9/2018 | Miyamura | H01R 13/6581 |

FOREIGN PATENT DOCUMENTS

| | | | | |
|---|---|---|---|---|
| DE | 10 2007 031 504 | | 1/2009 | H01R 13/629 |
| DE | 10 2010 011 370 | | 4/2011 | H01R 13/58 |
| DE | 102012111646 | A1 * | 6/2014 | H01R 13/40 |
| DE | 102014105144 | A1 * | 10/2015 | H01R 13/5219 |
| DE | 10 2014 110 466 | | 1/2016 | H01R 13/52 |
| DE | 20 2015 105 928 | | 1/2016 | H01R 13/6581 |
| DE | 102014110466 | A1 * | 1/2016 | H01R 13/5219 |
| DE | 10 2015 109 311 | | 12/2016 | H01R 24/00 |
| DE | 102015109311 | A1 * | 12/2016 | H01R 13/506 |
| EP | 3 104 469 | | 6/2016 | H01R 13/6585 |
| JP | 2006-66352 | | 3/2006 | H01R 24/00 |
| WO | WO-2015197773 | A1 * | 12/2015 | H01R 13/512 |

OTHER PUBLICATIONS

International Search Report and Written Opinion issued in PCT/DE2020/100669, dated Nov. 13, 2020, with English translation, 16 pages.

German Search Report issued in German Patent Appln. Serial No. 10 2019 121 872.1, dated Mar. 31, 2020, with machine English translation, 10 pages.

* cited by examiner

HYBRID PLUG-IN CONNECTOR

The invention is based on a hybrid plug-in connector of the generic type of independent claim 1.

Hybrid plug-in connectors of this kind are required in order to transmit both electronic data or signals and electrical energy by means of at least one multi-core line to a mating plug-in connector, in particular a bushing of a printed circuit board, in particular for industrial use.

In particular, the invention concerns a hybrid plug-in connector with what is known as a push-pull locking arrangement. Numerous variants of locking arrangements of this kind are known from the prior art and make provision for the plug-in connector to be readily plug-mounted onto a mating plug-in connector while at the same time providing protection against the plug-in connection becoming undesirably released. The plug-in connection can usually be released only by a way of a pulling movement on a locking sleeve associated with the plug-in connector. In so doing, both the locking arrangement and also the plug-in connection are then separated.

PRIOR ART

As part of the advancing digitization in industry, it is necessary to ensure ever higher data transmission rates in order to connect the continuously increasing number of actuators and sensors associated with automation and digitization to one another and to corresponding control node points and/or control devices. High channel capacities are required specifically for monitoring the processes virtually in real time. Data transmission powers are categorized, in particular in BUS systems such as PROFIBUS, CAN or Ethernet for example. Here, a currently very broad classification Cat-3 (category 3) describes, for example, a possible data transmission rate of up to ten megabits per second (10 Mbit/s). However, this data transmission rate is seldom sufficient for current applications, not only in information technology but also in industry. The Cat-5 (category 5) data transmission rate lies in the region of one gigabit per second (1 Gbit/s) and meets the current requirements in principle.

DE 20 2015 105 928 U1 discloses a hybrid plug-in connector which is able to allow the transmission of both electrical signals or electronic data and also electrical energy to a correspondingly suitable module at the same time. Therefore, a multi-core line can be used in a multifunctional manner and realized in both a space-saving and also cost-effective manner.

However, one disadvantage of the disclosed solution is that the combination of data lines and power transmission and the associated electromagnetic interference mean that high data transmission rates cannot be achieved unless an increasingly costly shielding device is integrated.

Furthermore, the round construction of the hybrid plug-in connector illustrated adds to the lack of security during a plug-in process. This is because, even though shaping of the plug-in connection on the basis of the poka-yoke principle is mentioned, a user has to check the intended plug-in position, at least by visual inspection.

Furthermore, the disclosure relating to locking of the corresponding hybrid plug-in connector to its mating plug-in connector concerns a screw connection. In principle, this locking arrangement is simple and provides secure retention but, in particular for assembly, requires a not inconsiderable installation space and is time-consuming.

The German Patent and Trademark Office has performed a search of the following prior art in the priority application pertaining to the present application: US 2011/0294342 A1, DE 298 04 728 U1, DE 298 04 728 U1, JP 2006-66352 A, US 2014/0162488 A1, DE 10 2007 031 504 A1, DE 10 2014 110 466 A1, U.S. Pat. No. 8,894,448 B2, DE 10 2010 011 370 B3, DE 10 2015 109 311 B4 and U.S. Pat. No. 9,106,025 B2.

OBJECT

The object of the invention is that of allowing a simple, space-saving and cost-effective way of transmitting electronic data and electrical power, wherein data transmission adapted to the current standards according to industrial categorization is rendered possible while at the same time achieving the greatest possible degree of security in respect of assembly, in particular in relation to the plug-in process as such.

Advantageous refinements of the invention are specified in the dependent claims and the following description.

DISCLOSURE OF THE INVENTION

The hybrid plug-in connector according to the invention is provided for connecting electrically conductive contacts to a mating plug-in connector, in particular a bushing. The hybrid plug-in connector receives at least two energy contacts for transmitting electrical energy and four data contact pairs for transmitting electrical signals and/or electronic data in a housing. Here, the housing is of basically rectangular shape and comprises at least one insulating body for fixing the contacts. Furthermore, the hybrid plug-in connector is provided with at least one shielding element for at least partially shielding the signal and/or data transmission taking place through the data contact pairs from possible electromagnetic interference. The shielding element is formed in such a way that the shielding of a data cable is at least largely maintained initially in the hybrid plug-in connector and in the state in which the hybrid plug-in connector is connected to the mating plug-in connector. Here, the four data contact pairs are arranged in a basically rectangular insulating body in a manner spatially separated from the energy contacts. The insulating body additionally has an offset in the axial direction between the data contact pairs and the energy contacts, so that the hybrid plug-in connector is uniquely positioned on its mating plug-in connector during a plug-in process.

The term electrical signals means, in particular, simple binary or analog values which are directly assigned and indicated. The term electronic data means, in particular, complex information which is evaluated/indicated/interpreted and possibly further processed by electronic logic modules and/or control elements. The term mating plug-in connector means, in particular, inversely shaped matching parts into which the hybrid plug-in connector can be spatially joined. The connection socket of a control device serves as an example of a described mating plug-in connector.

In an apt embodiment of the invention, a hybrid plug-in connector is releasably connected to a mating plug-in connector by means of a locking means, wherein the closure means has an outer sleeve which, when axially oriented pressure is applied, operates at least one locking element and, due to the outer sleeve being pulled in an axially oriented manner, unlocks the locking element, so that the hybrid plug-in connector can be separated from its mating plug-in connector in the same movement. In the prior art, these locking means are often called "push-pull locking arrangements". Push-pull locking arrangements have the advantage of simple locking together with simple releasability.

In a preferred embodiment, at least one latching lug is formed along each of at least two opposite sides of a rectangular outer sleeve within said outer sleeve. A further latching lug is integrally formed on the housing or the insulating body of the hybrid plug-in connector. When said hybrid plug-in connector is plug-mounted onto a mating plug-in connector, the latching lug of the outer sleeve slides over at least one retaining element integrally formed on the mating plug-in connector. The retaining element of the mating plug-in connector is brought into engagement with the latching lug of the insulating body when the hybrid plug-in connector is plug-mounted onto the mating plug-in connector. Due to the outer sleeve of the hybrid plug-in connector being pulled in a manner oriented counter to the plug-mounting direction, the latching lug of the insulating body is flexibly lifted out from the latching lug of the outer sleeve and released from the retaining element of the mating plug-in connector. As a result, the hybrid-plug-in connector can be removed from the mating plug-in connector without problems.

A particularly preferred embodiment provides that a contact receptacle of the data contact pair of the insulating body, in conjunction with the shielding element of the data contact pair together with a suitable cable, permits a data transmission rate in the region of greater than or equal to 1 Gbit/s.

In this way, standard Cat-5 is achieved and allows up-to-date data transmission rates while at the same time supplying a connected module with electrical power.

In this case, the data contact pairs are arranged at a distance from one another in a distance range of between 2 mm and 4 mm in a front view of the plug-in face. In particular, a distance of from 2.2 mm to 3.0 mm is preferred. In a claimed embodiment, the data contact pairs are spaced apart from one another with a 2.4 mm x-axial distance. In said embodiment, the data contact pairs are arranged with a 2.8 mm y-axial distance. In principle, it is feasible to interchange the axial distances.

The basically rectangular insulating body advantageously has a spatial separating element between the data contact pairs, wherein the separating element assumes a guiding function during the plug-in process. Due to the additional spatial separation of the data contacts, the use of pin contacts, amongst other things, ensures that the data contacts are not damaged during a plug-in process. That is to say, in this case, a spatial separating element is used primarily for improved guidance of the hybrid plug-in connector and in particular of the data contact pairs during a plug-in process. To this end, it is recommended to match the spatial separating element at least to the length of the pin contacts. The length of the separating element is ideally matched to the length of the insulating body in the region of the data contact pairs. This means that the separating element, at least to some extent, terminates flush with the region of the insulating body which receives the data contact pairs.

A preferred variant of the invention makes provision for the separating element to be embodied as a further shielding element which extends the shielding of the data contact pairs from the environment by shielding in each case one data contact from the respectively remaining data contact pairs. This means that the data contact pairs are shielded not only from the energy contacts and the environment but also from all adjacent data contact pairs. In other words, designing the separating element as a further shielding element ensures that all of the data contact pairs are individually shielded.

In one embodiment, the separating element, with respect to its geometry, is described by two plates which are arranged along two perpendicularly intersecting planes. Separating elements of this kind are usually called a shielding cross. Here, in an inventive embodiment, two flat plates are not simply designed in an intersecting manner, but rather the plates have special contours. These contours can be formed as grooves, tongues, wedges, recesses, reinforced portions or further advantageous formations.

A forward-looking embodiment provides that the data contact pairs are arranged within the insulating body in such a way that, in conjunction with the shielding elements and given use of a suitable cable, a data transmission rate in the region of greater than or equal to 10 Gbits/s is achieved. This data transmission rate corresponds to category Cat-6 and allows use of the hybrid plug-in connector for several years, due to the capacity which already goes beyond the current requirements in industry.

A clever embodiment recommends embodying the shielding element in the insulating body, on the cable side, over at least two contact elements which are embodied in a flexibly yielding manner and can be brought into contact with the shielding of a cable. This means primarily establishing the contact between the contact element of the shielding element, which contact element is embodied in a flexibly yielding manner, and the shielding braid of a data cable used. However, it may likewise mean a crimping sleeve which secures the shielding braid of the data cable used to the insulation of the data cable.

A particularly ingenious embodiment provides that the shielding element respectively has a contact area within the insulating body, which contact area is embodied in a flexibly yielding manner and is preferably arranged between two contacts of a data contact pair. This embodiment ensures that at least four contact areas provide that the shielding of the data contact pairs from their environment is ensured and continued to the mating plug-in connector. In one embodiment, a spring steel element projects out of the insulating body in such a way that, during a plug-in process, a shielding element of the mating plug can establish contact at best at all contact areas of the shielding element.

EXEMPLARY EMBODIMENT

An exemplary embodiment of the invention is illustrated in the drawings and will be explained in more detail below. In the drawings.

The figures contain partly simplified, schematic illustrations. In some cases, identical reference signs are used for elements which are similar but may not be identical. Different views of the same elements may be drawn to different scales.

Directional indications such as “left”, “right”, “top”, “bottom”, “above” and “below” are to be understood with reference to the figure in question and may vary in the individual illustrations in relation to the illustrated object.

The figures contain reference signs which are additionally identified by a “'” as an index. This indicates that the elements in question are, in principle, elements mentioned in the list of reference signs which can be shaped differently to the elements without a reference sign index or may differ from the differently numbered elements in form and/or function.

Figure 1:
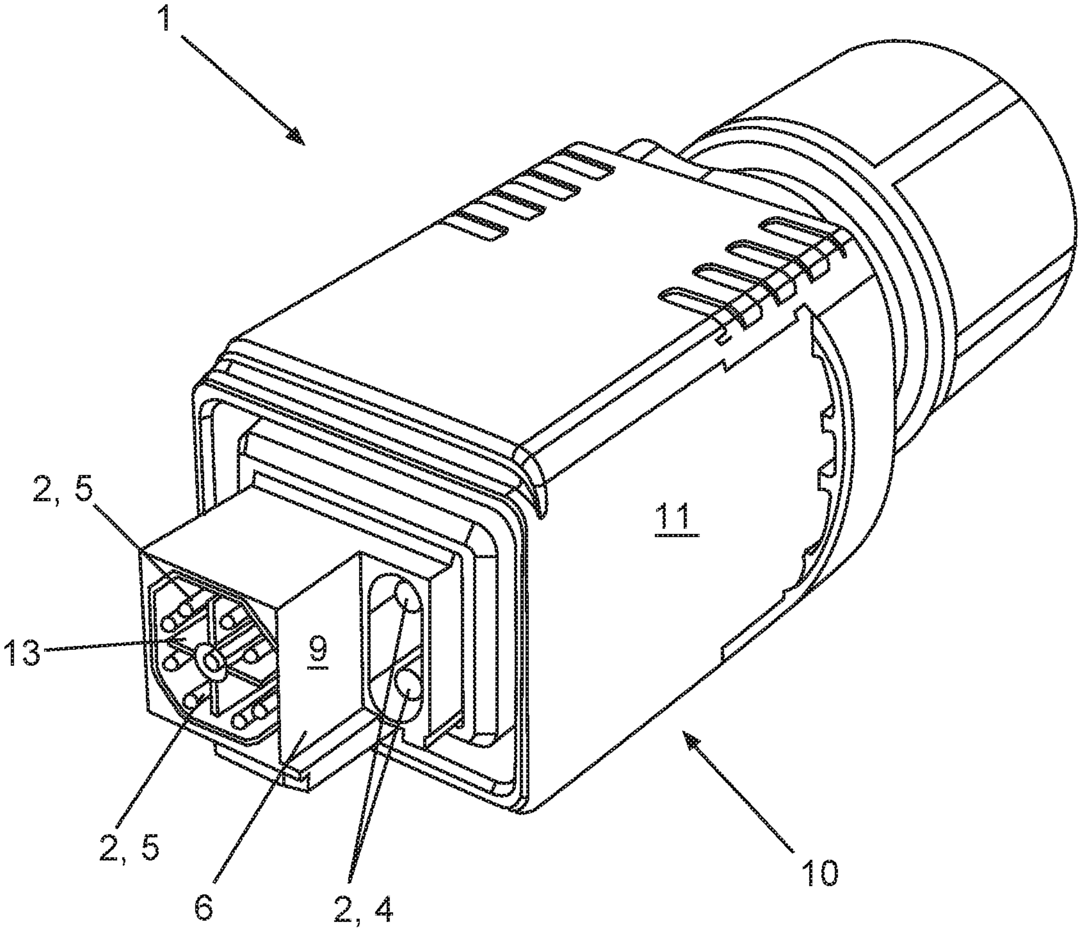
FIG. 1 shows a perspective illustration of a hybrid plug-in connector according to the invention.

FIG. 1 shows a hybrid plug-in connector 1 according to the invention as claimed in claim 1 in a three-dimensional manner of illustration. The hybrid plug-in connector 1 is provided with a total of 10 contacts 2. In this case, the contacts 2 partially differ in function. First, it can be seen that the energy contacts 4 are arranged remote from the data contacts 5. The insulating body 6 has a readily identifiable offset 9. In the illustrated exemplary embodiment, the data contacts 5 protrude considerably in relation to the other energy contacts 4. Furthermore, a closure means 10 known in the prior art as a “push-pull locking arrangement” can be seen. The outer sleeve 11 is arranged in a displaceable manner around the insulating body 7 in this case. Furthermore, a separating element 13 can be seen, which separating element provides spatial separation of the data contacts 5 arranged in pairs. This separating element 13 additionally ensures, besides the spatial separation, reliable guidance of the data contacts 5 of the hybrid plug-in connector 1 during a plug-in process. Furthermore, FIG. 1 shows further elements on the insulating body 7, in particular on the offset 9, these further elements initially simplifying the guidance of the hybrid plug-in connector 1 during a plug-in process with a mating plug-in connector 3. Furthermore, these formations prevent improper plug-connection of the hybrid plug-in connector 1, for example into an unsuitable mating plug-in connector.

Figure 2:
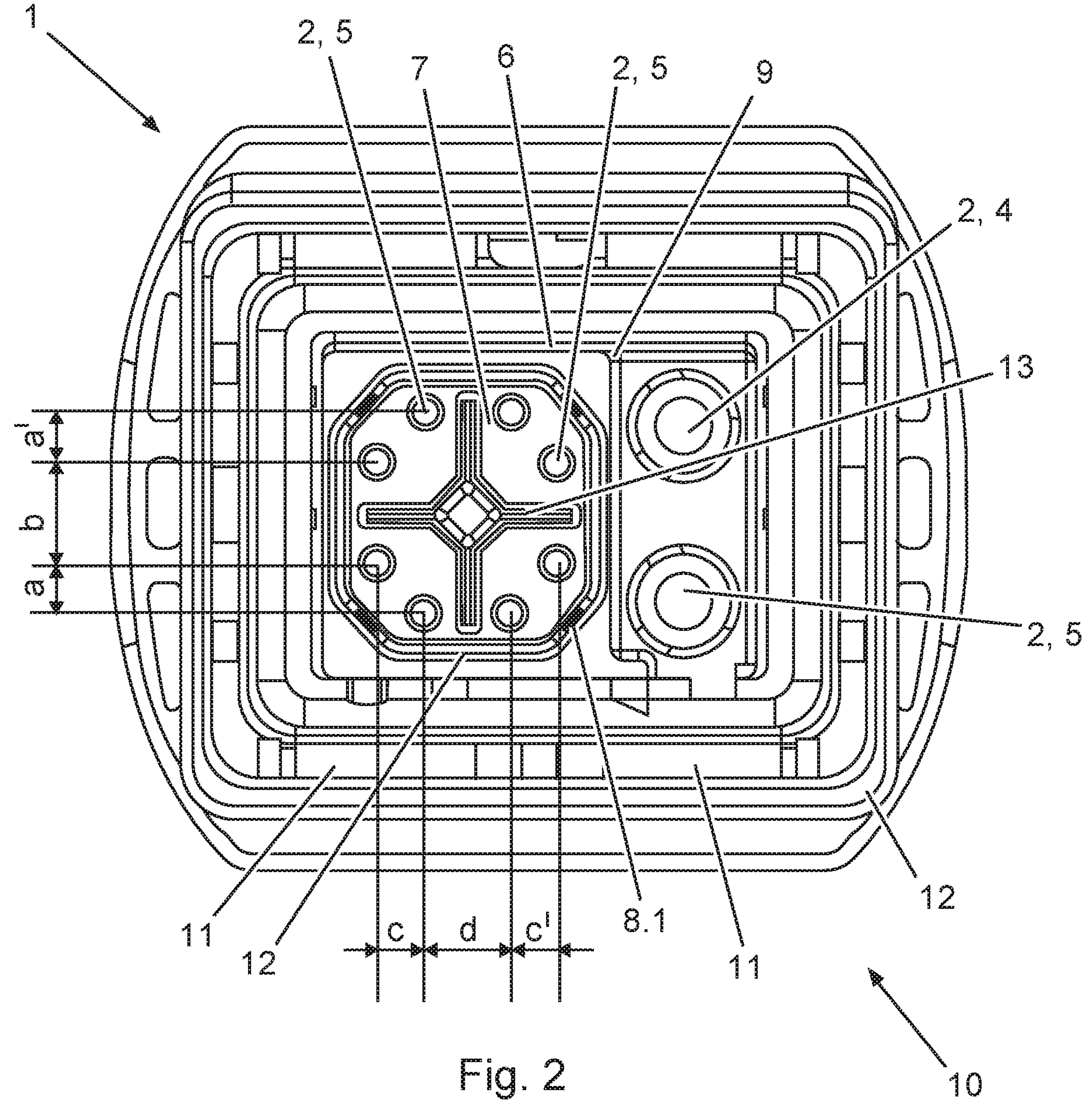
FIG. 2 shows a front view of the plug-in face of a hybrid plug-in connector according to the invention.

FIG. 2 shows a three-dimensional illustration of the plug-in face of the hybrid plug-in connector 1 shown in FIG. 1. Besides the abovementioned elements, a pair of points are shown more clearly. Firstly, the positioning of the contacts 2 can be better understood. Here, it is clear that the energy contacts 4 are arranged along a straight line running vertically through the illustration. The data contacts 5 are arranged in pairs in order to be able to be assigned to data cables with twisted core pairs, what are known as “twisted pair cables”, in a useful way. Between the corresponding paired data contacts 5, it can be seen that grooves, or cutouts, are provided in the insulating body 7, these allowing projections of the shielding element 8 which are used as contact areas to pass through in the direction of the data contacts 5. The offset 9 that has become clear in FIG. 1 can be seen here as an abovementioned integrally formed element which is intended to further ensure the plug-in security. The projection will engage into a correspondingly shaped step in the insulating body 7 of the mating plug-in connector 3.

In order to achieve the desired data transmission rate of greater than or equal to 1 Gigabit/second and nevertheless to use as little installation space as possible, besides the shielding by the shielding element 8, the spacing of the data contacts 5 is also adjusted. The data contact pairs 5 are arranged at a distance range of between 2 mm and 4 mm away from one another. The preferred design has a distance a, a' between the data contacts 5 within a data contact pair of 1.3 mm along a horizontal here. A distance b of 2.4 mm is achieved between the data contact pairs. Here, distances between the data contacts 5 within a data contact pair in relation to one another of 1.4 mm are assumed along a vertical. The data contact pairs are spaced apart by 2.8 mm in relation to one another along a vertical axis.

These dimensions allow a hybrid plug-in connector 1 in line with DIN EN 61076-3-106 to be provided, which hybrid plug-in connector can nevertheless transmit both data and power. Data transmission rates in line with category 5 are possible here. Owing to the design of the separating element 13 as an additional shielding element, that is to say as what is known as a shielding cross, category 6 can be achieved. Furthermore, the energy contacts 4 are designed to transmit current up to 10 A at 24 V DC. The locking elements 11 of the hybrid plug-in connector 1 which locks using the push-pull principle are indicated.

Figure 3:
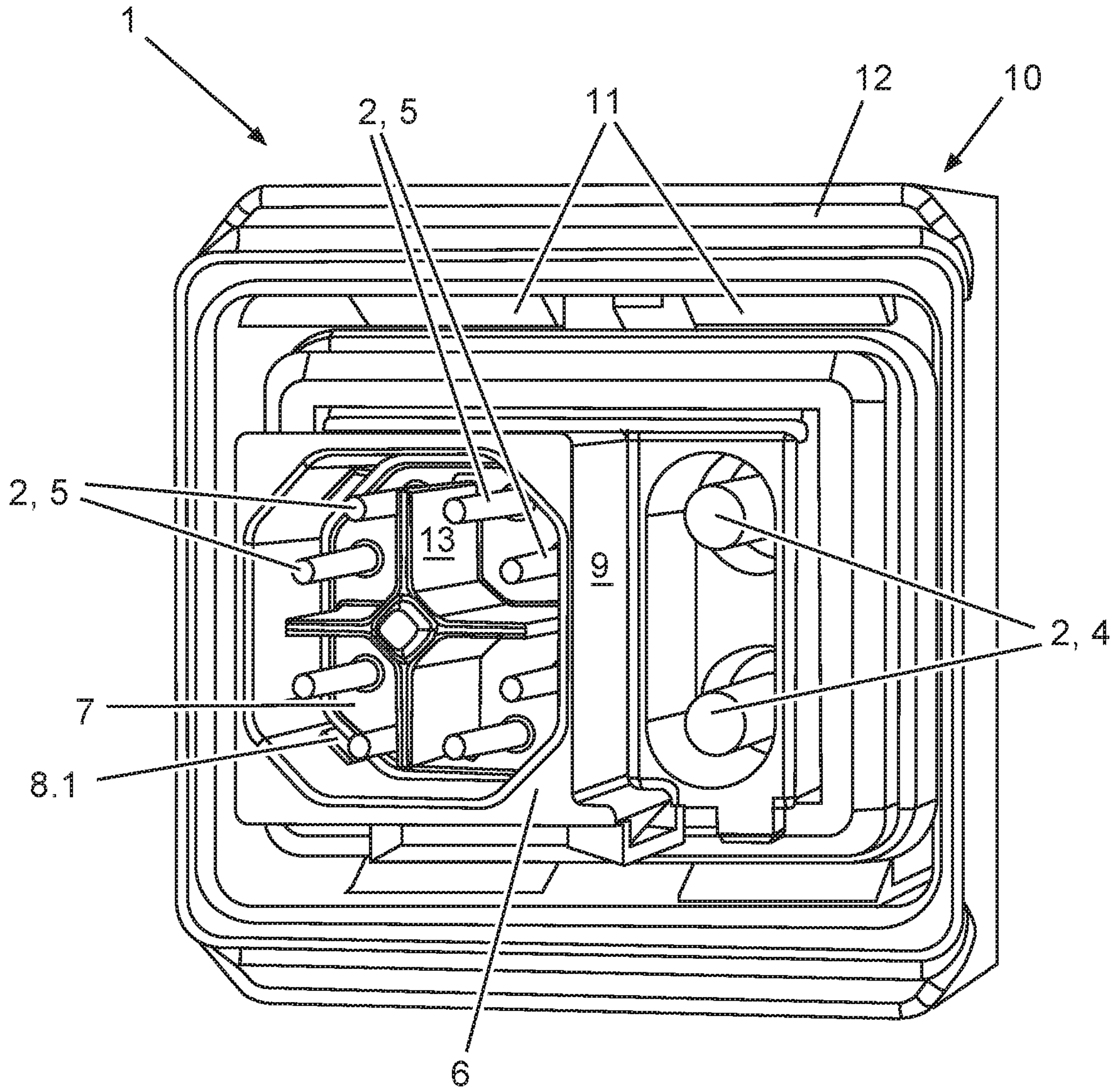
FIG. 3 shows a view of a detail of the plug-in face of a hybrid plug-in connector according to the invention with particular focus on the contact areas of the shielding element.

The spatial arrangement of the contacts 2 and in particular the arrangement of the shielding element 8 or its contact areas is shown in FIG. 3. The formation of the insulating body 7 with its offset 9 between the data contacts 5 and the energy contacts 4 is once again made clear. In addition, further design elements of the insulating body 7 are also obvious. All visible geometric forms serve for plug-in security and are intended to ensure that a plug-in process is executed in a simpler and more secure manner. The separating element 13 illustrated may be designed as a shielding cross. The dimensioning of the separating element 13 which can be designed as a shielding cross is also conceivable as a continuous element between the shielding element 8 and could be used to achieve further improved data transmission rates. The locking elements 12 of the closure means 10 can be seen more clearly here than in the previous FIGS. 1 and 2.

Figure 4:
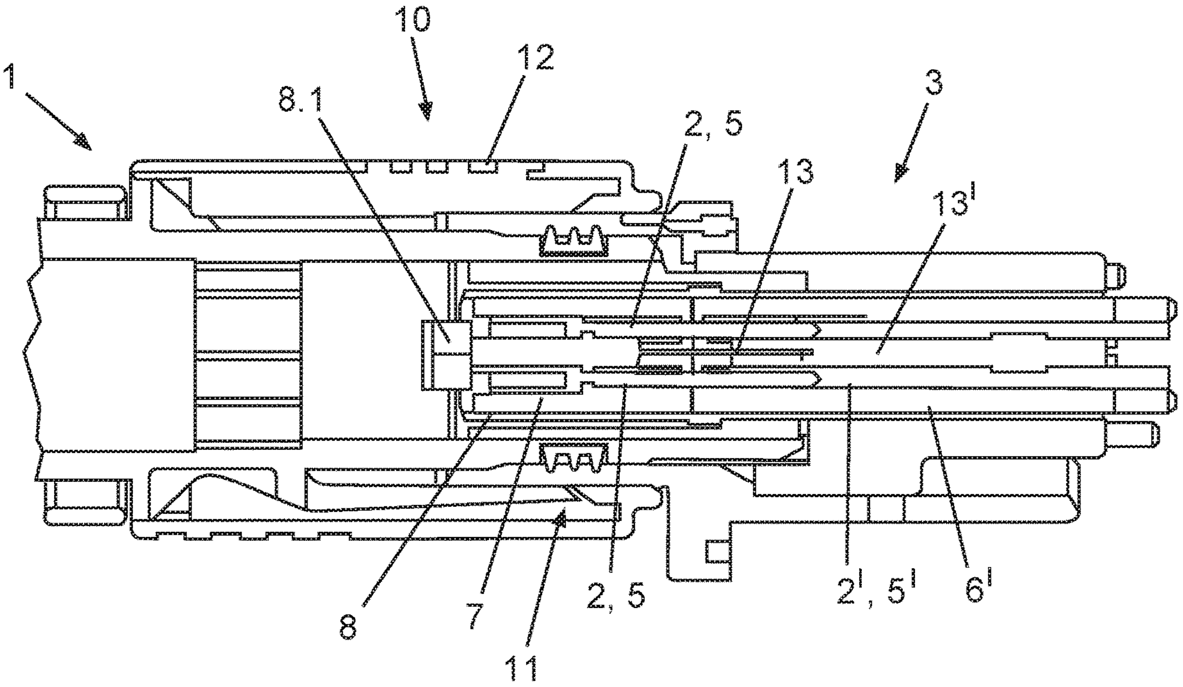
FIG. 4 shows a longitudinal section through a hybrid plug-in connector according to the invention in the state in which it is connected to a mating plug-in connector.

FIG. 4 shows a longitudinal section through a hybrid plug-in connector 1 according to the invention in the state in which it is plug-connected to a mating plug-in connector 3. Here, the contacts 2 in the hybrid plug-in connector 1 are designed as pin contacts. Congruent socket contacts 2' are made in the mating plug-in connector 3. The insulating body 7 projects, by way of its offset 8, into the mating plug 3. The shielding element 8 of the hybrid plug-in connector 1 is brought into contact with the shielding element 8' of the mating plug-in connector 3 along the described contact areas. The shielding to be continued is performed by a data cable, not illustrated. The shielding in data cables is usually performed by metal braids, but metallic foil is often also used in order to achieve better shielding. This shielding can then be taken over by the shielding transmission element 8.1 of the hybrid plug-in connector 1 and continued. In other words, the shielding against electromagnetic radiation is continued by a cable within the hybrid plug-in connector 1 and, for its part, transmitted to a mating plug-in connector 3. In order to achieve a further improved data transmission rate, the separating element 13 can be designed as an additional shielding element and establish shielding between the data contacts 5 or the data contact pairs. This shielding cross then engages into the separating element 13' in the mating plug-in connector 3, which separating element is likewise designed as a shielding element.

Figure 5:
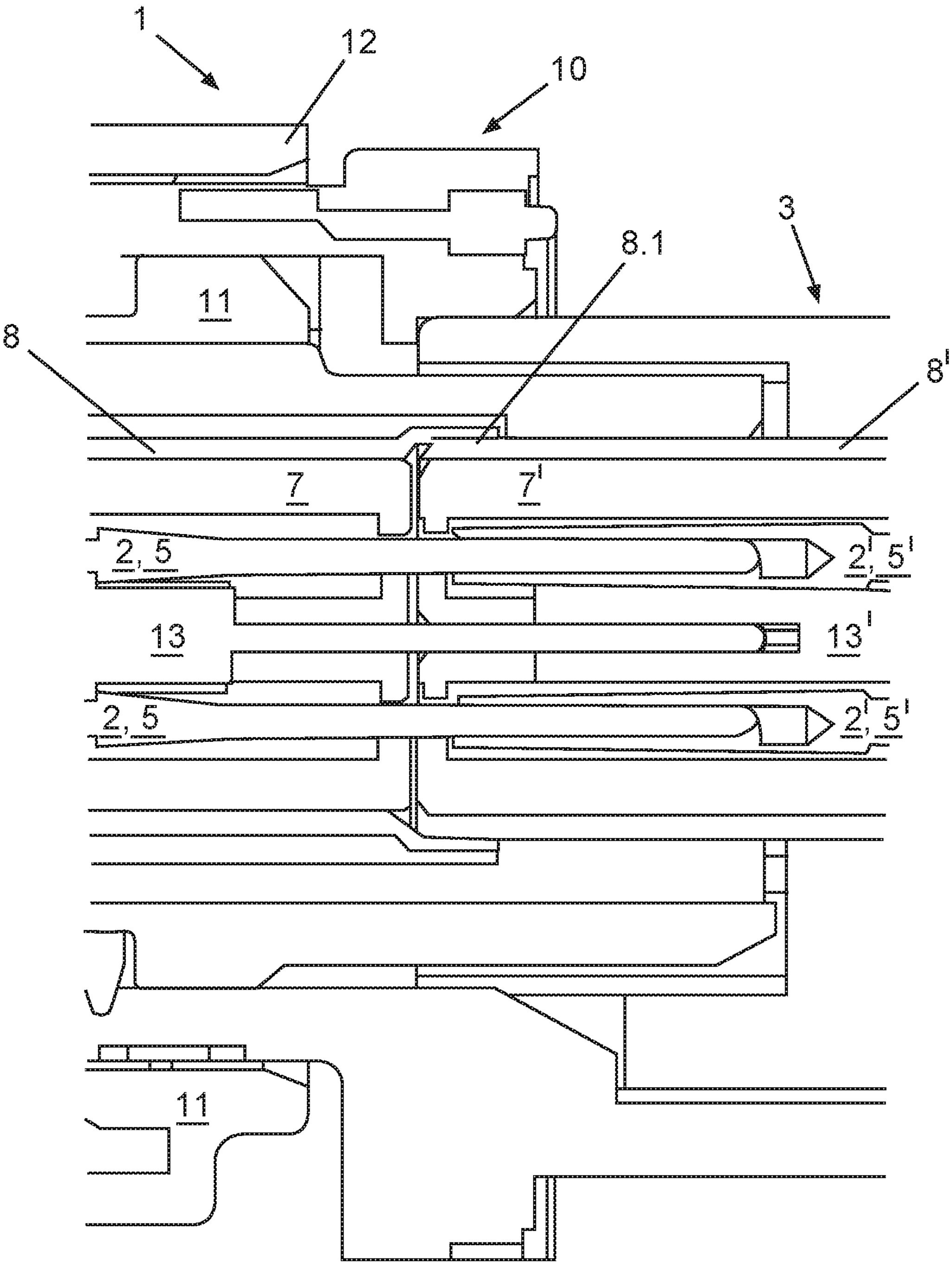
FIG. 5 shows a longitudinal section through a hybrid plug-in connector according to the invention with particular focus on the contact areas of the shielding element in the plug-connected state.

Details relating to the process of establishing contact by the shielding elements 8 and 8' and the engagement of the insulating body 7, by way of its offset 9, into the insulating body 6' of the mating plug-in connector 3 are apparent from the cross section of a hybrid plug-in connector 1 according to the invention illustrated in FIG. 5. Here, it can be particularly clearly seen that the design of the shielding element 8 provides tabs which project flexibly beyond the insulating body 7 into the region of the data contacts 5. This ensures that the shielding element 8' of a mating plug-in connector 3 can establish a secure connection to the shielding element 8 of the hybrid plug-in connector 1 as soon as a plug-in process takes place.

Even though various aspects or features of the invention are shown respectively in combination in the figures, it is clear to a person skilled in the art—unless stated otherwise—that the illustrated and discussed combinations are not the only ones possible. In particular, mutually corresponding units or feature complexes from different exemplary embodiments can be exchanged with one another.

LIST OF REFERENCE SIGNS

- 1 Hybrid plug-in connector
- 2, 2' Contact
- 3 Mating plug-in connector
- 4, 4' Energy contact
- 5, 5' Data contact
- 6, 6' Housing
- 7, 7' Insulating body
- 8, 8' Shielding element
- 8.1 Shielding transmission element
- 9 Offset
- 10 Closure means
- 11 Locking element
- 12, 12' Outer sleeve
- 13 Separating element
- a, a' Vertical distance between contacts within a data contact pair
- b Vertical distance between data contact pairs
- c, c' Horizontal distance between contacts within a data contact pair
- d Horizontal distance between data contact pairs

The invention claimed is:

1. A hybrid plug-in connector for connecting electrically conductive contacts to a mating plug-in connector, in particular a bushing, wherein the hybrid plug-in connector has at least two energy contacts for transmitting electrical energy and four data contact pairs for transmitting electrical signals and/or electronic data in a housing which is of basically rectangular shape and comprises at least one insulating body for fixing the contacts, having at least one shielding element for at least partially shielding the signal and/or data transmission taking place through the data contact pairs from possible electromagnetic interference, wherein the shielding element is formed in such a way that the shielding of a data cable is at least largely maintained initially in the hybrid plug-in connector and in the state in which the hybrid plug-in connector is connected to the mating plug-in connector, wherein the four data contact pairs are arranged in a basically rectangular insulating body in a manner spatially separated from the energy contacts, wherein the insulating body has an offset in the axial direction with respect to the longitudinal axis of the hybrid plug-in connector between the data contact pairs and the energy contacts, so that the hybrid plug-in connector is uniquely positioned on its mating plug-in connector during a plug-in process, and wherein the separating element is embodied as a further shielding element which extends the shielding of the data contact pairs from the environment by shielding in each case one data contact from the respectively remaining data contact pairs.

2. The hybrid plug-in connector as claimed in claim 1, wherein the hybrid plug-in connector is configured to be releasably connected to a mating plug-in connector by a locking device, wherein the locking device has an outer sleeve which, when axially oriented pressure is applied in the longitudinal direction of the hybrid plug-in connector brings at least two locking elements into engagement with one another and, due to the outer sleeve being pulled in an axially oriented manner in the longitudinal direction, unlocks the at least two locking elements, so that the hybrid plug-in connector can be separated from its mating plug-in connector in the same movement.

3. The hybrid plug-in connector as claimed in claim 2, wherein the data contact pairs are arranged within the insulating body in such a way that, in conjunction with the shielding element and given use of a suitable cable, a data transmission rate in the region of greater than or equal to 1 Gbit/s can be achieved.

4. The hybrid plug-in connector as claimed in claim 2, wherein the basically rectangular insulating body has a spatial separating element between the data contact pairs, wherein the separating element assumes a guiding function during the plug-in process.

5. The hybrid plug-in connector as claimed in claim 4, wherein the separating element, with respect to its geometry, is described by two plates which are arranged along two perpendicularly intersecting planes.

6. The hybrid plug-in connector as claimed in claim 2, wherein the shielding element in the insulating body has, on the cable side, at least two transmission elements which are embodied in a flexibly yielding manner and can be brought into contact with the shielding of a cable.

7. The hybrid plug-in connector as claimed in claim 2, wherein the shielding element respectively has a contact area within the insulating body, which contact area is embodied in a flexibly yielding manner and is basically arranged between two contacts of a data contact pair.

8. The hybrid plug-in connector as claimed in claim 1, wherein the data contact pairs are arranged within the insulating body in such a way that, in conjunction with the shielding element and given use of a suitable cable, a data transmission rate in the region of greater than or equal to 1 Gbit/s can be achieved.

9. The hybrid plug-in connector as claimed in claim 8, wherein the basically rectangular insulating body has a spatial separating element between the data contact pairs, wherein the separating element assumes a guiding function during the plug-in process.

10. The hybrid plug-in connector as claimed in claim 1, wherein the basically rectangular insulating body has a spatial separating element between the data contact pairs, wherein the separating element assumes a guiding function during the plug-in process.

11. The hybrid plug-in connector as claimed in claim 10, wherein the separating element is embodied as a further shielding element which extends the shielding of the data contact pairs from the environment by shielding in each case one data contact from the respectively remaining data contact pairs.

12. The hybrid plug-in connector as claimed in claim 11, wherein the separating element, with respect to its geometry, is described by two plates which are arranged along two perpendicularly intersecting planes.

13. The hybrid plug-in connector as claimed in claim 11, wherein the data contact pairs are arranged within the insulating body in such a way that, in conjunction with the shielding elements and given use of a suitable cable, a data transmission rate in the region of greater than or equal to 10 Gbits/s can be achieved.

14. The hybrid plug-in connector as claimed in claim 10, wherein the separating element, with respect to its geometry, is described by two plates which are arranged along two perpendicularly intersecting planes.

15. The hybrid plug-in connector as claimed in claim 14, wherein the data contact pairs are arranged within the insulating body in such a way that, in conjunction with the shielding elements and given use of a suitable cable, a data transmission rate in the region of greater than or equal to 10 Gbits/s can be achieved.

16. The hybrid plug-in connector as claimed in claim 10, wherein the data contact pairs are arranged within the insulating body in such a way that, in conjunction with the shielding elements and given use of a suitable cable, a data transmission rate in the region of greater than or equal to 10 Gbits/s can be achieved.

17. The hybrid plug-in connector as claimed in claim 10, wherein the data contact pairs are arranged within the insulating body in such a way that, in conjunction with the shielding elements and given use of a suitable cable, a data transmission rate in the region of greater than or equal to 10 Gbits/s can be achieved.

18. The hybrid plug-in connector as claimed in claim 1, wherein the shielding element in the insulating body has, on the cable side, at least two transmission elements which are embodied in a flexibly yielding manner and can be brought into contact with the shielding of a cable.

19. The hybrid plug-in connector as claimed in claim 1, wherein the shielding element respectively has a contact area within the insulating body, which contact area is embodied in a flexibly yielding manner and is basically arranged between two contacts of a data contact pair.

* * * * *